(12) United States Patent
Okada et al.

(10) Patent No.: US 7,069,277 B2
(45) Date of Patent: Jun. 27, 2006

(54) MANAGEMENT OF MULTIPLE GENERATIONS OF BACKUP DATA

(75) Inventors: Wataru Okada, Odawara (JP); Hirokazu Ikeda, Yamato (JP); Hironori Emaru, Yokohama (JP); Masahide Sato, Chiba (JP); Masahiro Yamada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1 day.

(21) Appl. No.: 10/939,470

(22) Filed: Sep. 14, 2004

(65) Prior Publication Data
US 2005/0149577 A1 Jul. 7, 2005

(30) Foreign Application Priority Data
Dec. 26, 2003 (JP) ............................. 2003-432113

(51) Int. Cl.
G06F 17/30 (2006.01)
(52) U.S. Cl. ..................................... 707/203
(58) Field of Classification Search ............. 707/1–10, 707/100–104.1, 200–205
See application file for complete search history.

(56) References Cited
U.S. PATENT DOCUMENTS

| | | | |
|---|---|---|---|
| 5,487,160 A | 1/1996 | Bemis | |
| 5,778,395 A * | 7/1998 | Whiting et al. | 707/204 |
| 6,154,817 A | 11/2000 | Mohan et al. | |
| 6,397,229 B1 | 5/2002 | Menon et al. | |
| 6,611,850 B1 * | 8/2003 | Shen | 707/204 |
| 6,658,435 B1 | 12/2003 | McCall | |
| 2002/0107877 A1 * | 8/2002 | Whiting et al. | 707/204 |
| 2002/0144069 A1 | 10/2002 | Arakawa et al. | |
| 2003/0014605 A1 | 1/2003 | Slater et al. | |
| 2004/0039888 A1 | 2/2004 | LeCrone et al. | |

FOREIGN PATENT DOCUMENTS
JP 11-194964 7/1999

OTHER PUBLICATIONS
"Quantum's Guide To Protecting Your Data," Quantum Corporation, US, 1997, pp. 1-20.

* cited by examiner

Primary Examiner—Mohammad Ali
(74) Attorney, Agent, or Firm—Antonelli, Terry, Stout and Kraus, LLP.

(57) ABSTRACT

A backup system is configured by interconnecting a backup management device and disk array device via a SAN. The backup management device allows an administrator to set backup cycle, number of backup generations, and save periods. On the basis of these settings, the backup management device performs an overwrite decision process, and executes backup processes in such a way that the administrator can manage the desired number of generations of backup data with a limited number of volumes. By so doing, the administrator is able to manage multiple generations of backup data, while being allowed to set the save period for each generation on an individual basis.

8 Claims, 20 Drawing Sheets

MOVE DIVIDER LINE L2

Fig.5

VOLUME TABLE

| VOLUME ID | LUN | ACQUISITION TIME | OVERWRITE-ENABLE FLAG | TAPE BACKUP FLAG |
|---|---|---|---|---|
| 1 | 1 | 2003/07/23 00:00 | NG | FALSE |
| 2 | 2 | 2003/07/23 04:00 | NG | FALSE |
| 3 | 3 | 2003/07/23 08:00 | NG | FALSE |
| 4 | 7 | 2003/07/23 12:00 | NG | FALSE |
| 5 | 8 | — | OK | FALSE |

Fig.6

SAVE PERIOD TABLE

| SAVE PERIOD ID | START (hr) | END (hr) |
|---|---|---|
| 1 | 0 | 2 |
| 2 | 2 | 6 |
| 3 | 6 | 10 |
| 4 | 10 | 16 |

Fig.8

TAPE BACKUP CATALOG

| BACKUP ID | TAPE ID | OFFSET | SIZE | ACQUISITION TIME |
|---|---|---|---|---|
| 1 | 1 | 0 | 30 | 2003/07/23 00:00 |
| 2 | 1 | 30 | 30 | 2003/07/22 14:00 |
| 3 | 2 | 0 | 30 | 2003/07/22 06:00 |
| 4 | 2 | 30 | 30 | 2003/07/21 14:00 |
| 5 | 3 | 0 | 30 | 2003/07/21 14:00 |

OVERVIEW OF OVERWRITE DECISION

CASE 1

CASE 2

MANAGEMENT OF MULTIPLE GENERATIONS OF BACKUP DATA

BACKGROUND

The present invention relates to management of multiple generations of backup data.

In recent years, storage devices for storing large amounts of data have become widespread. A storage device of this kind is connected via a network to a number of information processing devices. In the storage device, backup is carried out so as to enable data to be restored in the event that a physical or logical failure has occurred in a volume storing data used for service. In many instances, such backup is carried out at predetermined periodic intervals (a backup cycle). Backup data is typically managed in multiple generations.

Ordinarily, there is a limit as to the number of backup volumes for storing backup data. Thus, when managing multiple generations of backup data, several volumes are rotated, and backup carried out while overwriting the new backup data onto volumes holding backup data that is no longer needed. Settings such as the number of generations of backup data to be managed and save period for which backup data should be saved, that is, the array of the period for which the administrator wishes to keep at least one backup data, are made by the administrator. Then, on the basis of the number of backup volumes, number of backup data generations, and the save periods, the administrator creates a backup schedule.

Various algorithms may be employed to create a backup schedule that involves backing up while rotating a number of volumes. Examples of such algorithms include the "round robin", "GFS (Grandfather-Father-Son)" and "tower of Hanoi" algorithms. Also know is the technique taught in Japanese Patent Laid-Open Gazette No. 11-194964.

However, the algorithms mentioned above have the drawback that one save period is interrelated to the others such that if the save period is modified, it is necessary to simultaneously modify the other save periods, and this drawback makes it difficult for the administrator to set the save period on an individual basis. Especially, from the standpoint of efficient utilization of a limited number of backup volumes, it would be desirable to be able to set save periods on an individual basis.

SUMMARY

With the foregoing in view, it is an object of the present invention to provide a technique enabling an administrator to administer multiple generations of backup data, while being able to set the save period on an individual basis.

To address the aforementioned issue at least in part, the invention employs the following arrangements. The backup management device of the invention resides in a backup management device that manages multiple generations of backup data by rotating a plurality of rewriteable backup media while recording backup data onto the backup media according to a predetermined backup cycle. The device comprises: a save period input unit that receives save periods for which the backup data should be saved, the save period being individually set by the administrator for the multiple generations; an overwrite-targeted backup medium selecting unit that selects an overwrite-targeted backup medium to create first generation backup, that is to create new backup, and when the result of selection is that there is no medium that can be overwritten, prepares a new backup medium and executes first generation backup, or issues a warning to the administrator.

Here, "rotating a plurality of rewriteable backup media" refers to "using a plurality of backup media, overwriting new backup data onto a medium that is no longer needed." Backup cycle refers to a periodic time interval at which backups are performed. For any one backup medium, the time interval at which overwrites are performed need not be constant, but may vary instead. The rewriteable backup media onto which backup data is recorded may be composed of physical units, or logical units. Exemplary physical units are magnetic tape, CDs, DVDs and the like. Exemplary logical units are logical volumes set up within a storage device.

By means of the present invention, it is a simple matter to create a backup schedule, even in cases that it is difficult to a create backup schedule to fulfill save periods the administrator wants with "tower of Hanoi" or other algorithm. An administrator can then carry out backups according to the backup schedule created by the backup management device. That is, the administrator can manage multiple generations of backup data, while being able to set the save periods on an individual basis.

In another aspect the invention may be provided as an interface. The interface of the invention resides in an interface for use in a backup management device that manages multiple generations of backup data by rotating a plurality of rewriteable backup media while recording backup data onto the backup media according to a predetermined backup cycle. The interface has a period display area displayed together with a time axis, predetermined areas of length corresponding to period length and divided by means of divider lines into areas equal in number to the number of the save periods for which the backup data should be saved, and the length of each area being displayed as the length of each save period, wherein the period display area allows a the save period to be modified by means of moving a the divider line through operation of a pointing device by the user.

By so doing an administrator can easily set a save period by moving divider lines through operation of a pointing device, while verifying the length of each save period by viewing the period display areas. As a result, the backup management device offers improved convenience.

The invention may also be provided as a backup management device that executes backups while determines which medium new backup can be overwritten onto at each time to execute backup; or as a backup management device that carries out simulated backup management in advance, outputs the number of backup media needed for backup and the order of overwriting, and then administers backups in accordance therewith. The various features of these backup management devices may also be combined appropriately. In yet another aspect the invention may be provided as a method of controlling such backup management devices. It may also be realized through various other embodiments, such as a computer program for realizing the above; a recording medium having such a program recorded thereon; or a data signal containing such a program and embodied in a carrier wave.

Where the invention is provided as a computer program or a recording medium having such a program recorded thereon, it may be provided as an entire program for controlling operation of a backup management device, or as an arrangement of units for carrying out the functions of the invention only. As recording media, there could be employed any of various kinds of computer-readable media, such as a flexible disk, CD-ROM, DVD-ROM, magnetic optical disk, IC card, ROM cartridge, punch card, printed matter having a bar code or other symbols imprinted thereon, a computer internal storage device (RAM, ROM or other such memory), or an external storage device.

BRIEF DESCRIPTION OF THE DRAWINGS

FIG. 5 is an illustration showing an example of a volume table;

FIG. 6 is an illustration showing an example of a save period table;

FIG. 8 is an illustration showing an example of a tape backup catalog;

DESCRIPTION OF THE PREFERRED EMBODIMENTS

Figure 1:
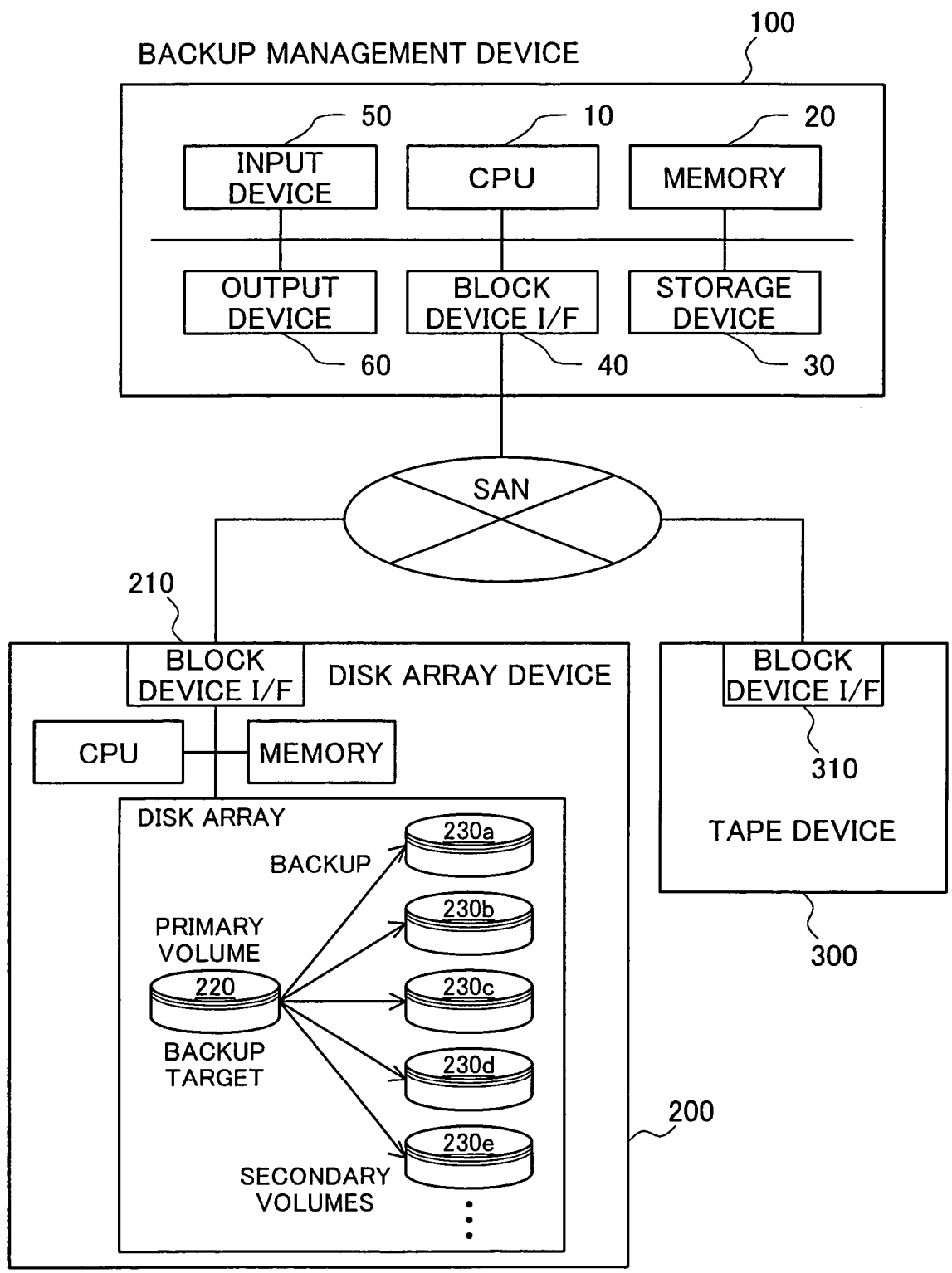
FIG. 1 is an illustration of the arrangement of a backup system 1000 as one embodiment of the invention.

One mode of carrying out the invention is discussed below as a preferred embodiment in the following sequence:
A. Arrangement of Backup System:
B. First Embodiment:
   B1. Backup Management Device:
   B2. Schedule Mode:
      B2-1: Backup Schedule Creation Process:
      B2-2: Overwrite Decision Process
      B2-3: Backup Process
   B3. Serial Decision Mode
C. Second Embodiment:
D. Variations:

A. Arrangement of Backup System:

FIG. 1 is an illustration of the arrangement of a backup system 1000 as one embodiment of the invention. This backup system 1000 is a system for administering multiple generations of backup using a limited number of rotated volumes. The backup system 1000 of this embodiment comprises a backup management device 100, a disk array 200, and a tape device 300. These are interconnected via a SAN (Storage Area Network). The SAN is a high-speed communication-capable network that uses fiber channel technology. The Internet, a LAN, or other network could be employed in place of a SAN.

The backup management device 100 is a computer comprising a CPU 10, memory 20, storage device 30, block device interface 40, input device 50, output device 60 and the like. As will be discussed later, the backup management device 100 performs backups according to an administrator-set backup cycle, backup generation number, and save periods. Backup cycle refers to a periodic time interval at which backups are performed. Save period refers to a period for which the administrator wishes to keep at least one backup data.

Storage device 30 has stored therein various programs for executing backups. One of there programs is the program which backs up data stored in a primary volume 220 in disk array 200 onto secondary volumes 230a, 230b, 230c, 230d, 230e . . . (hereinafter referred to collectively as secondary volumes 230) and manages these backups. Also included is a program for backing up data stored in secondary volumes 230 to magnetic tape in the tape device 300.

The block device interface 40 is an interface for communicating with other devices via the SAN. As the block device interface 40, a host adaptor could be used, for example.

Input device 50 could include a keyboard, mouse or the like. Output device 60 could include a display, printer, or the like.

Disk array 200 is a computer comprising a CPU, memory, and a number of disks (a disk array), for storing large amounts of data on disk. Block device interface 210 is an interface for communicating with other devices via the SAN. Disks in disk array 200 are arranged logically into a primary volume 220 and secondary volumes 230. The primary volume 220 is a volume for storing data that is normally used by a server (not shown) connected to the SAN, and is the volume storing data that will be backed up. The secondary volumes 230 are volumes to which backups are made. During a backup or restore operation, disk array 200 copies data at high speed between the primary volume and a secondary volume, while performing bare control of synchronization and split between the two. Since the number of secondary volumes 230 is limited, secondary volumes 230 are used in rotation while managing backup of multiple generations.

Tape device 300 comprises a plurality of tape drives, and is used to store backup data in the disk array 200 to magnetic tape. Block device interface 310 is an interface for communicating with other devices via the SAN.

Figure 2:
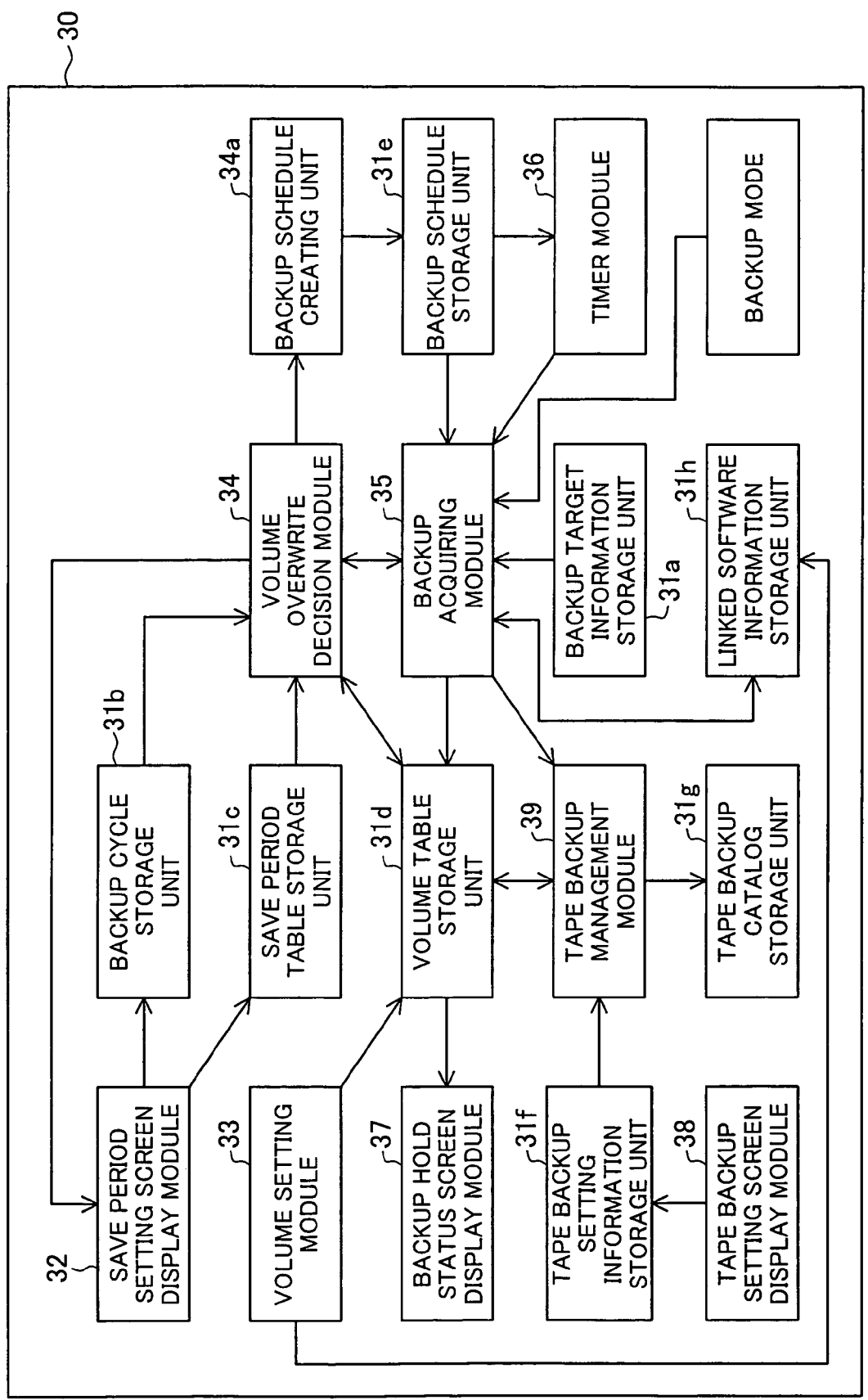
FIG. 2 is an illustration of a simplified arrangement of the backup administration device 100 of a first embodiment.

B. First Embodiment:

B1. Backup Management Device:

FIG. 2 is an illustration of a simplified arrangement of the backup management device 100 of a first embodiment. The backup management device 100 comprises the modules shown in the drawing. While these are provided in a software arrangement, they could instead be provided in a hardware arrangement.

The backup management device 100 of this embodiment has two automatic backup modes, namely, schedule mode and serial decision mode. Schedule mode is a backup mode in which a backup schedule that includes the order of rotation of secondary volumes 230 to which backups are to be made is created in advance, and backups are executed according to this backup schedule. Serial decision mode is a backup mode in which a secondary volume 230 to which backup is to be made is selected serially at each backup cycle, and backup executed accordingly. The backup mode can be selected by the administrator.

As an example of application of the invention, an arrangement wherein the backup management device is equipped with either schedule mode or serial decision mode would also be possible.

A save period setting screen display module 32 displays a graphical user interface enabling the administrator to set backup cycle and save periods. This graphical user interface will be described later. The backup cycle set here is stored in a backup cycle storage unit 31b. The save periods which have been set are stored in the form of a save period table in a save period table storage unit 31c. The save period table will be described later. The save period setting screen display module 32 corresponds to the save period input unit and backup cycle input unit in the invention.

A volume setting module 33 displays on the display a volume setting screen enabling the administrator to make settings in relation to secondary volumes 230 to which backups are to be made. The specifics of the settings are stored as a volume table in a volume table storage unit 31d. The volume setting screen and volume table will be described later. The volume table storage unit 31d corresponds to the medium information storage unit in the invention.

A volume overwrite decision module 34 carries out an overwrite decision process making reference to the backup cycle stored in the backup cycle storage unit 31b, the save period table stored in the save period table storage unit 31c, and the volume table stored in the volume table storage unit 31d. The overwrite decision process is a process for deciding whether it is possible to overwrite new backup data onto a secondary volume 230 having backup data previously stored therein. On the basis of the decision, the volume overwrite decision module 34 updates the contents of the volume table stored in the volume table storage unit 31d. The overwrite decision process will be described in greater detail later.

In the event that schedule mode has been set, the volume overwrite decision module 34 conducts a simulation to calculate the number of secondary volumes 230 needed to carry out management of multiple generations of backup data. Specifically, the volume overwrite decision module 34 sets up a virtual backup volume, and in cooperation with a backup acquiring module 35 and a timer module 36, described later, executes a virtual overwrite decision process.

Where schedule mode has been set, a backup schedule creating unit 34a creates a backup schedule on the basis of the result of the simulation carried out by the volume overwrite decision module 34. In the backup schedule is noted the order of rotation of secondary volumes 230, and the like. The backup schedule created by the backup schedule creating unit 34a is stored in a backup schedule storage unit 31e. In a backup management device furnished with serial decision mode only, the backup schedule creating unit 34a and backup schedule storage unit 31e would not be needed.

The backup acquiring module 35, upon being notified by the timer module 36 that the time for a backup has arrived, makes reference to a backup target information storage unit 31a having backup target information stored therein, and executes the backup process. In this embodiment, backup target information consists of an ID uniquely identifying the primary volume 220 targeted for backup. In the event that schedule mode has been set, the backup acquiring module 35 executes the backup process in accordance with the backup schedule stored in the backup schedule storage unit 31e. In the event that serial decision mode has been set, the backup acquiring module 35, by means of the volume overwrite decision module 34, executes an overwrite decision process in each backup cycle, and on the basis of the decision executes the backup process. These processes will be described later. The backup process includes backing up the primary volume 220 to a secondary volume 230, and backing up secondary volumes 230 to magnetic tape in tape device 300 (tape backup).

A tape backup setting screen display module 38 displays on the display a tape backup setting screen enabling the administrator to specify a backup tape to be used when backups are made. The specifics of the settings are stored in a tape backup setting information storage unit 31f In the event that there is no need for tape backup of backup stored in overwrite-targeted volumes, the tape backup setting screen display module 38 and tape backup setting information storage unit 31f will not be needed.

A tape backup management module 39 carries out tape backup on the basis of tape backup setting information stored in tape backup setting information storage unit 31f and the volume table stored in volume table storage unit 31d. The specifics of tape backup are stored in the form of a tape backup catalog in a tape backup catalog storage unit 31g. The tape backup catalog will be described later. When tape backup has been carried out, the tape backup administration module 39 also updates the contents of the volume table in the volume table storage unit 31d. In the event that there is no need for tape backup of backup stored in overwrite-targeted volumes, the tape backup administration module 39 and tape backup catalog storage unit 31g will not be needed.

When the administrator operate to display the hold status of backup data, a backup hold status screen display module 37 refers to the volume table stored in the volume table storage unit 31d and displays on the display hold status of backup data held in secondary volumes 230. The backup hold status display screen will be described later.

Figure 3:
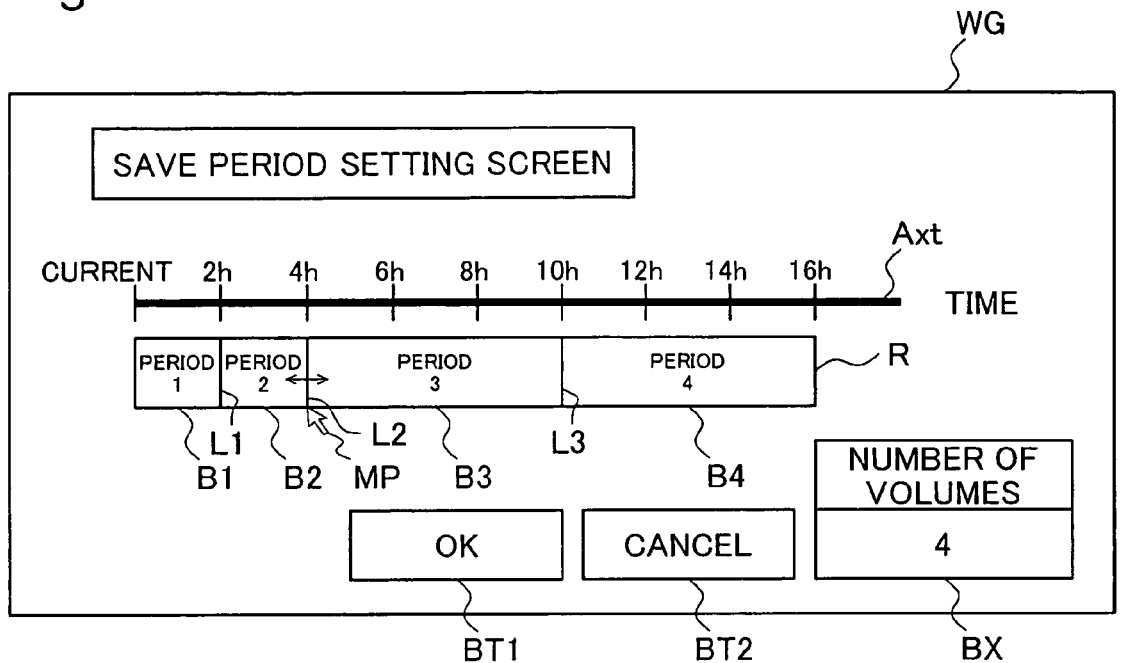
FIG. 3 is an illustration showing an example of a save period setting screen.
Figure 3:
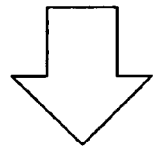
Figure 3:
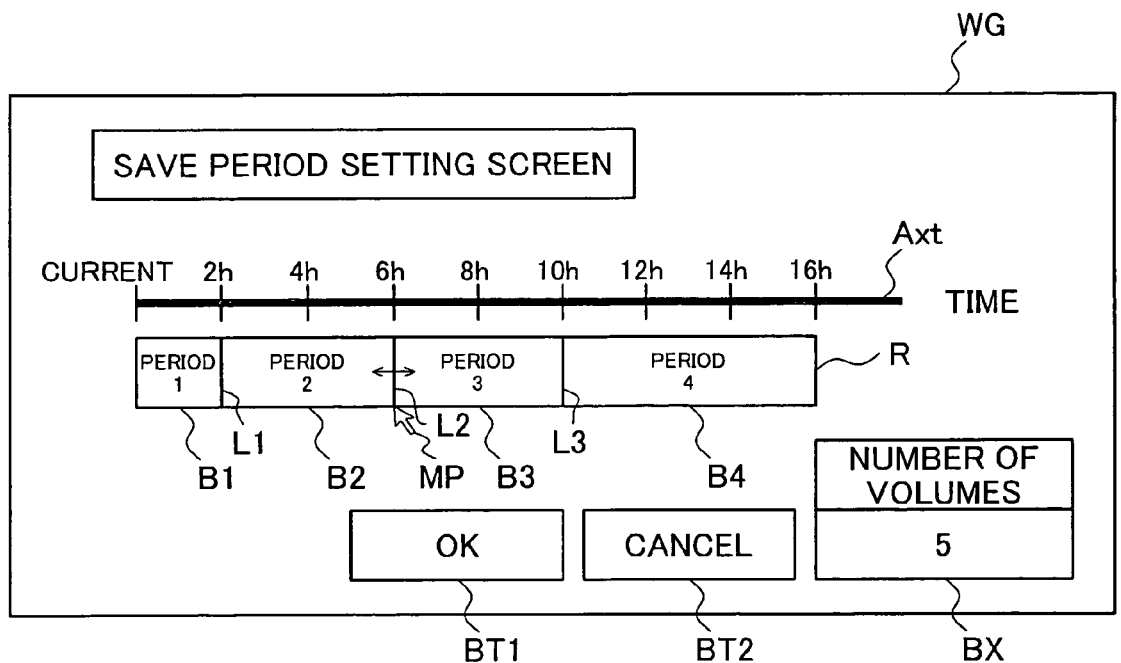

FIG. 3 is an illustration showing an example of a save period setting screen. This save period setting screen displays a graphical user interface WG enabling the administrator to input backup cycle and save periods. By means of this graphical user interface WG, the administrator can readily input backup cycle and save periods. This graphical user interface WG corresponds to the interface in the invention.

In graphical user interface WG are displayed a time axis Axt going back in time from the current point in time, a save period display area R displaying multiple generations of save periods, an "OK" button BT1 to confirm settings, and a "CANCEL" button BT2. In schedule mode, there is also displayed a box BX for displaying the number of volumes needed, which is one of the results of the simulation described earlier.

The save period display area R is divided by means of divider lines into a plurality of areas. These areas correspond in number to the number of save periods. The length of each area along time axis Axt corresponds to the length of the save period. In the illustrated example, save period display area R is divided by means of divider lines L1, L2, L3 into a four successive areas B1~B4, showing that the number of backup generations is four. By adding or deleting lines, the administrator can increase or decrease the number of save periods. While viewing the graphical user interface WG, an administrator operating a mouse or other pointing device can select a divider line with the mouse pointer MP and move the divider line in the direction of time axis Axt in order to modify the length of a save period.

The extent to which a divider line can be moved will be limited by the condition that, "the length of save period (n+1) (where n is a natural number) must be equal to or greater than the length of save period n." Save period (n+1) must also be older than save period n. For example, at top in FIG. 3, since the length of save period 3 is 6 hours, the length of save period 4 is limited to 6 hours or more. Accordingly, unless save period 4 is made longer, divider line L3 cannot be moved to the right. That is, the third generation save period cannot be made longer.

In schedule mode, if a divider line in the graphical user interface WG is moved in order to modify the length of a save period, the simulation described earlier is executed automatically, and the number of required volumes in box BX is updated. In this embodiment, the length of the first generation save period is the backup cycle. Save periods are multiples of the backup cycle.

Figure 4:
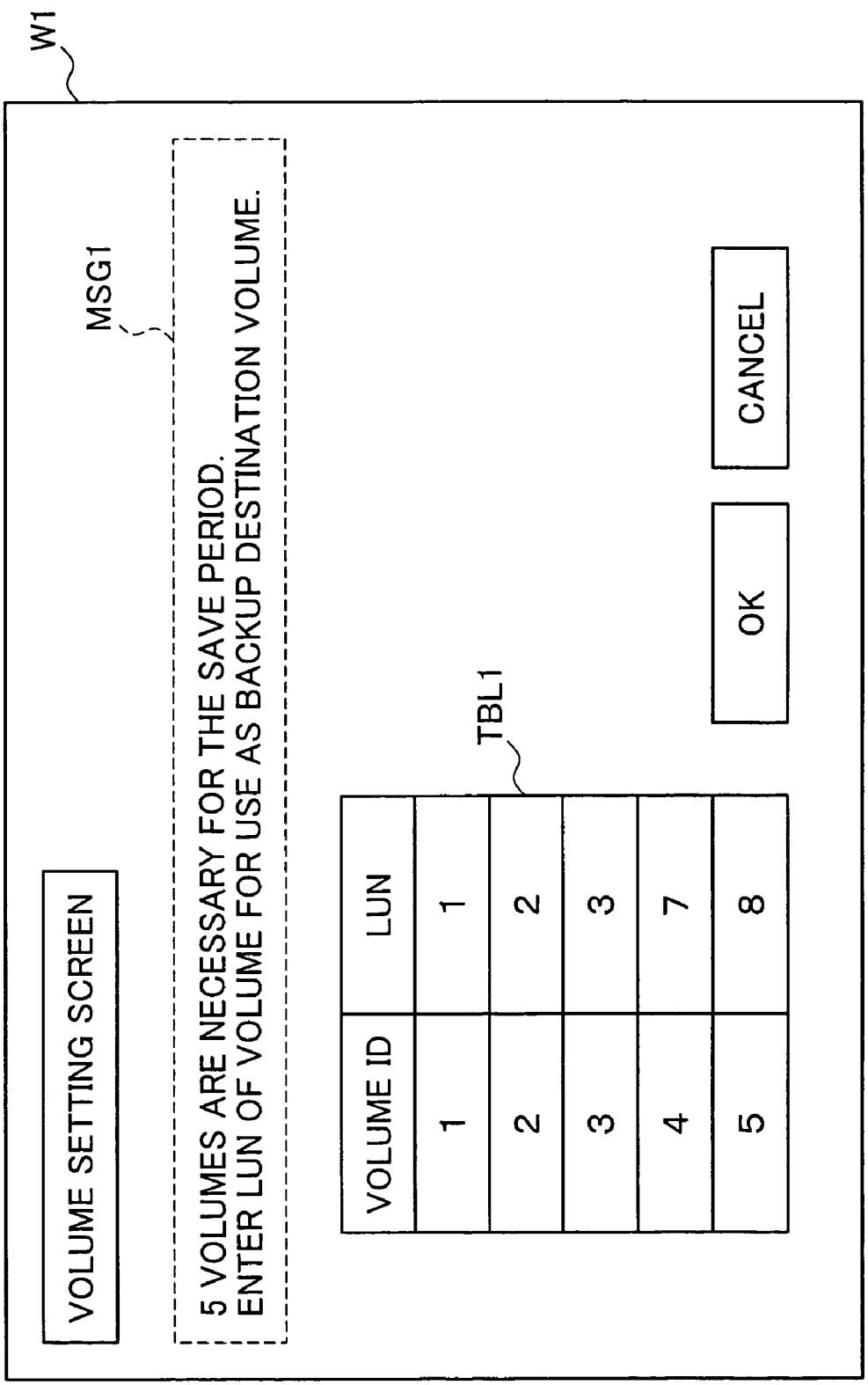
FIG. 4 is an illustration showing an example of a volume setting screen.

FIG. 4 is an illustration showing an example of a volume setting screen. The screen is displayed on the display when, in schedule mode, the "OK" button BT1 of the graphical user interface WG shown in FIG. 3 is clicked. As illustrated, volume setting screen W1 displays a message MSG1 prompting the administrator to select backup volumes, a table TBL1 for setting backup volumes, an "OK" button for confirming settings, and a "CANCEL" button. In table TBL1 are displayed volume IDs in a number corresponding to the number of backup volumes; the administrator inputs the LUN (logic unit number) of the secondary volume 230 corresponding to each volume ID. In serial decision mode, there will be displayed a screen for setting information for linking with a provisioning tool able to assign a volume if necessary. Information set from this screen is stored in a linked software information storage unit 31h.

FIG. 5 is an illustration showing an example of a volume table. This volume table is a table for recording backup volume settings, backup hold status of each volume, and the like. In the volume table are recorded the volume IDs and LUNs set in the volume setting screen W1 shown in FIG. 4, backup data acquisition time, an overwrite-enable flag which is the result of the decision by the volume overwrite decision module 34, and a data backup flag. The contents of the volume table are updated each time that a backup process is executed. Where there is no need for tape backup of backup data stored in a overwrite-targeted volume, there is no need for the tape backup flag.

FIG. 6 is an illustration showing an example of a save period table. In the save period table are recorded in associated fashion save period IDs in a number corresponding to the number of backup generations, start time of each save period, and end time.

Figure 7:
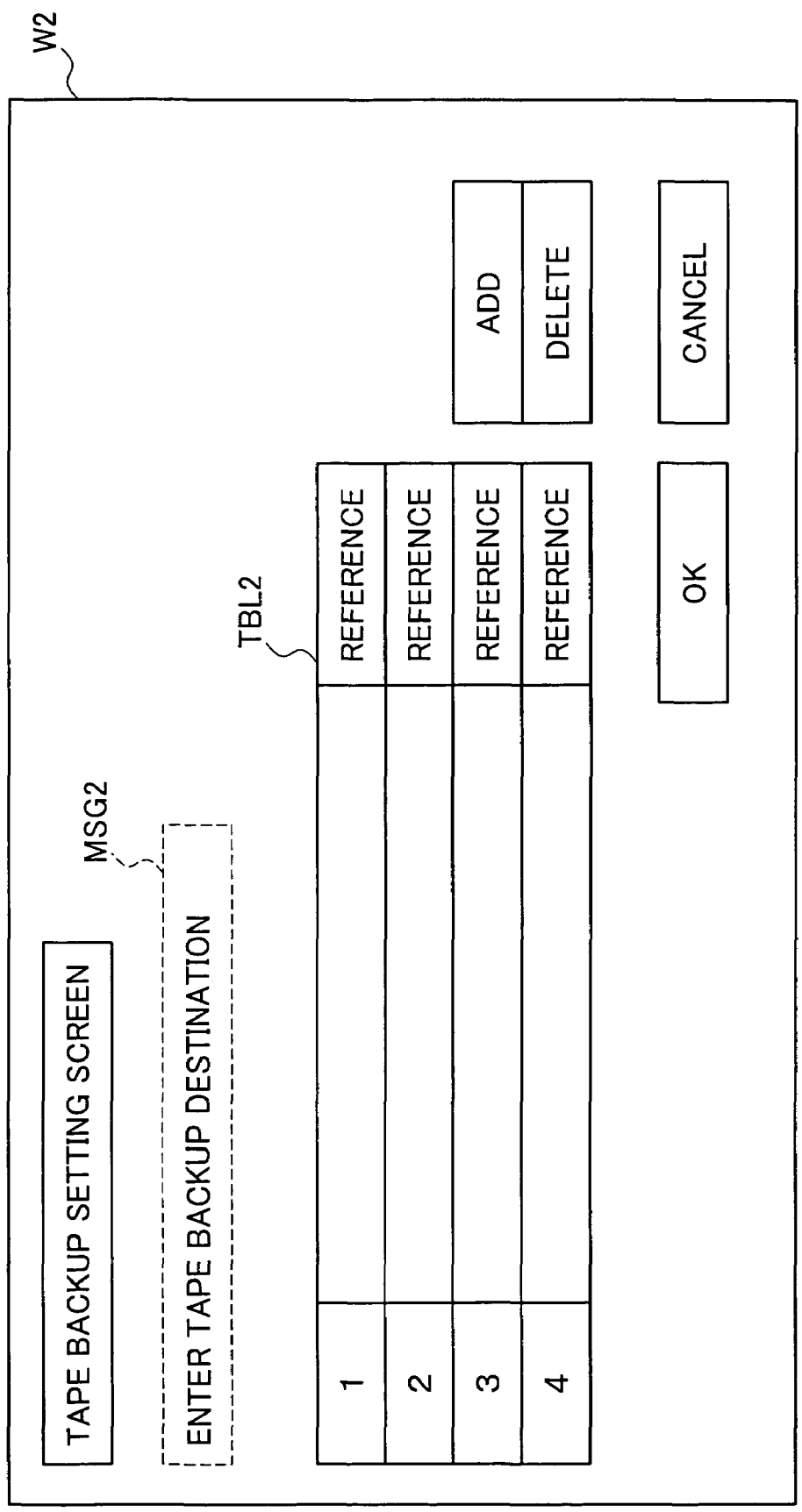
FIG. 7 is an illustration showing an example of a tape backup setting screen.

FIG. 7 is an illustration showing an example of a tape backup setting screen. In tape backup setting screen W2 are displayed a message MSG2 prompting the administrator to select a tape backup, a table TBL2 for setting backup tapes, an "ADD" button for adding a backup tape, a "DELETE" button for deleting a backup tape, an "OK" button for confirming settings, and a "CANCEL" button. The administrator inputs into table TBL2 a tape ID identifying a backup tape.

FIG. 8 is an illustration showing an example of a tape backup catalog. In the tape backup catalog is recorded a data backup history, namely, backup ID; tape ID; offset, i.e. the start position of data on magnetic tape; size of backup data; and backup acquisition time. Other necessary information may be recorded in the tape backup catalog as well.

Figure 9:
FIG. 9 is an illustration showing results of simulation by a volume overwrite decision module 34, and an example of a backup schedule 31s.

FIG. 9 is an illustration showing results of simulation by volume overwrite decision module 34, and an example of a backup schedule 31s, where the backup mode is schedule mode. At left in the drawing is shown a backup schedule 31s that shows simulation results and that is based on the results of the simulation shown at right. Here there is depicted a case in which three save periods are retained, under the condition of the first save period being identical to the backup cycle and the second save period and third save period being twice the length first save period. In this case, the volume overwrite decision module 34 will calculate the number of required secondary volumes 230 to be three. Simulation will be described later.

The numbers shown in the grid squares at left indicate the volume ID of secondary volumes for carrying out backup. Numbers outside the grid indicate backup iteration. For example, the numbers indicate that during the first backup iteration, backup is performed to a secondary volume 230 assigned "VOLUME ID: 1", with the first save period backup being saved by this "VOLUME ID: 1." During the second backup iteration, "VOLUME ID: 1" saves the second save period backup, with first save period backup being saved by "VOLUME ID: 2." In the illustrated example, it will be apparent that there is pattern whereby six backups make up one set, in the order of rotation of secondary volumes 230.

At right in FIG. 9 is a backup schedule 31s used when managing multiple generations of backup data using a plurality of secondary volumes 230. This backup schedule 31s specifies the ID of the secondary volume 230 to which backup is being made for each backup cycle. In the illustrated example, backup schedule 31s indicates that the first backup iteration is executed using the secondary volume 230 assigned volume ID 1, with backups of the second iteration, third iteration and so on being executed according to the order shown in FIG. 9 using secondary volumes 230 with the corresponding volume IDs; after the sixth backup iteration has been executed, the process returns to number 1 in the order, and backup is executed using the secondary volume 230 with the corresponding volume ID.

In the backup schedule 31s shown at right in the drawing, "OVERWRITE VOLUME" is a flag indicating the volume ID of the secondary volume 230 to which backup will be performed by overwriting thereof during the next backup. The backup volume is indicated by the "VOLUME ID" corresponding to the "NUMBER" for which the flag is set to "ON." As shown in the drawing, the location at which the flag is set to "ON" moves in sequence each time that backup is executed. That is, the location at which the flag is set to "ON" moves in the order "Number 1" → "Number 2" → "Number 3" → . . . . As described previously, in the illustrated example, since the order of rotation of secondary volumes 230 has a pattern whereby six backups make up one set, once the location at which the flag is "ON" reaches "Number 6", it then returns to "Number 1."

Figure 10:
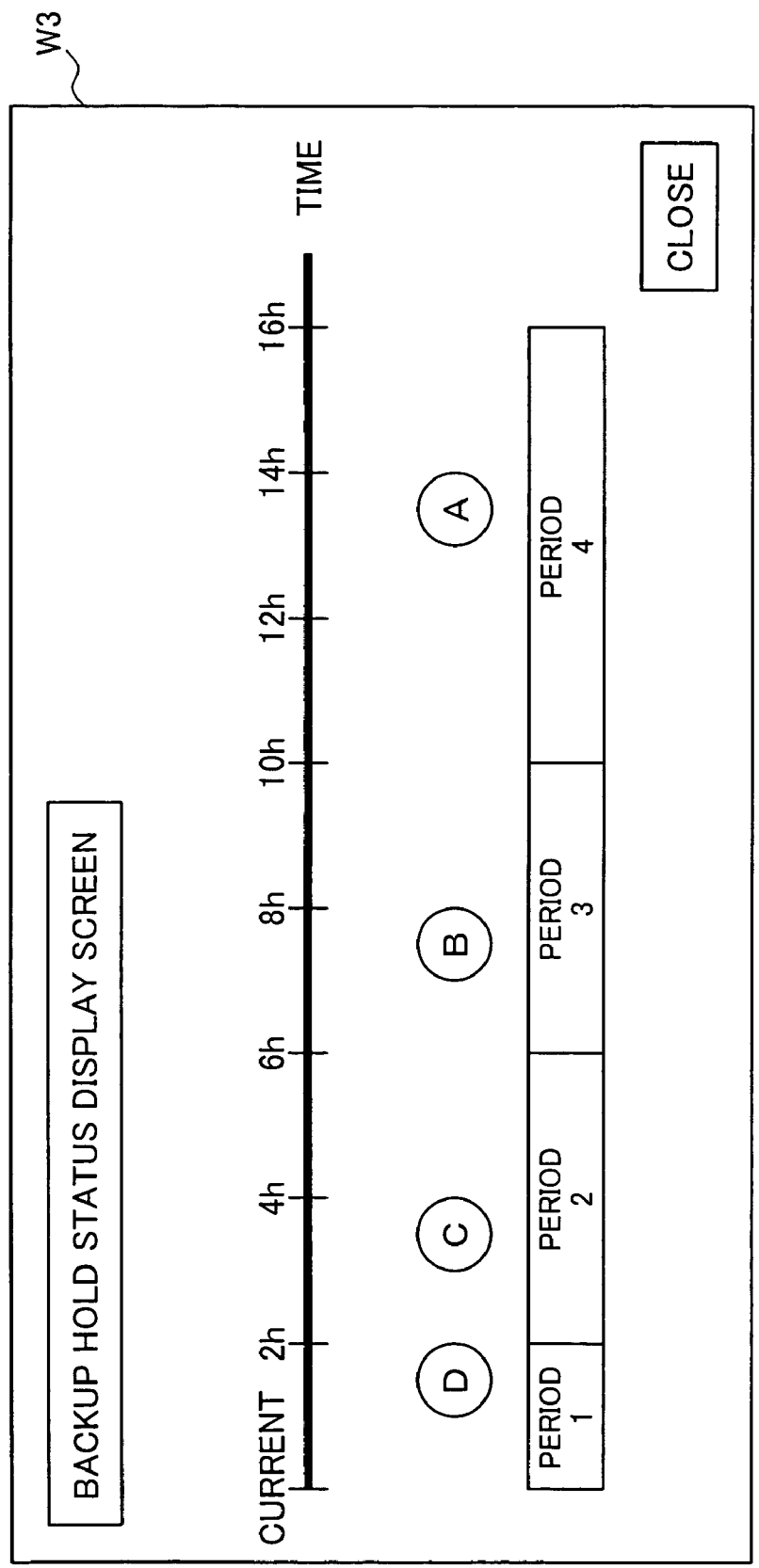
FIG. 10 is an illustration showing an example of a backup hold status display screen.

FIG. 10 is an illustration showing an example of a backup hold status display screen. On the backup hold status display screen W3 are displayed a time axis going back in time from the current point in time, a backup data hold status in each save period, and a "CLOSE" button for terminating display of backup hold status display screen W3. Here, there is illustrated a display example wherein backup data is managed over four save periods, with the first save period being two hours, the second save period and third save period each being 4 hours, and the fourth save period being six hours. The encircled letters "A", "B", "C", "D" each indicate backup data. The display location moves rightward in the drawing with time. By visually checking the display locations, an administrator can readily ascertain administration status, such as when each set of backup data has been acquired.

B2. Schedule Mode:

Following is a description of backup in schedule mode. During backup in schedule mode, first, a backup schedule is created, and backups are then executed according to the backup schedule so created.

Figure 11:
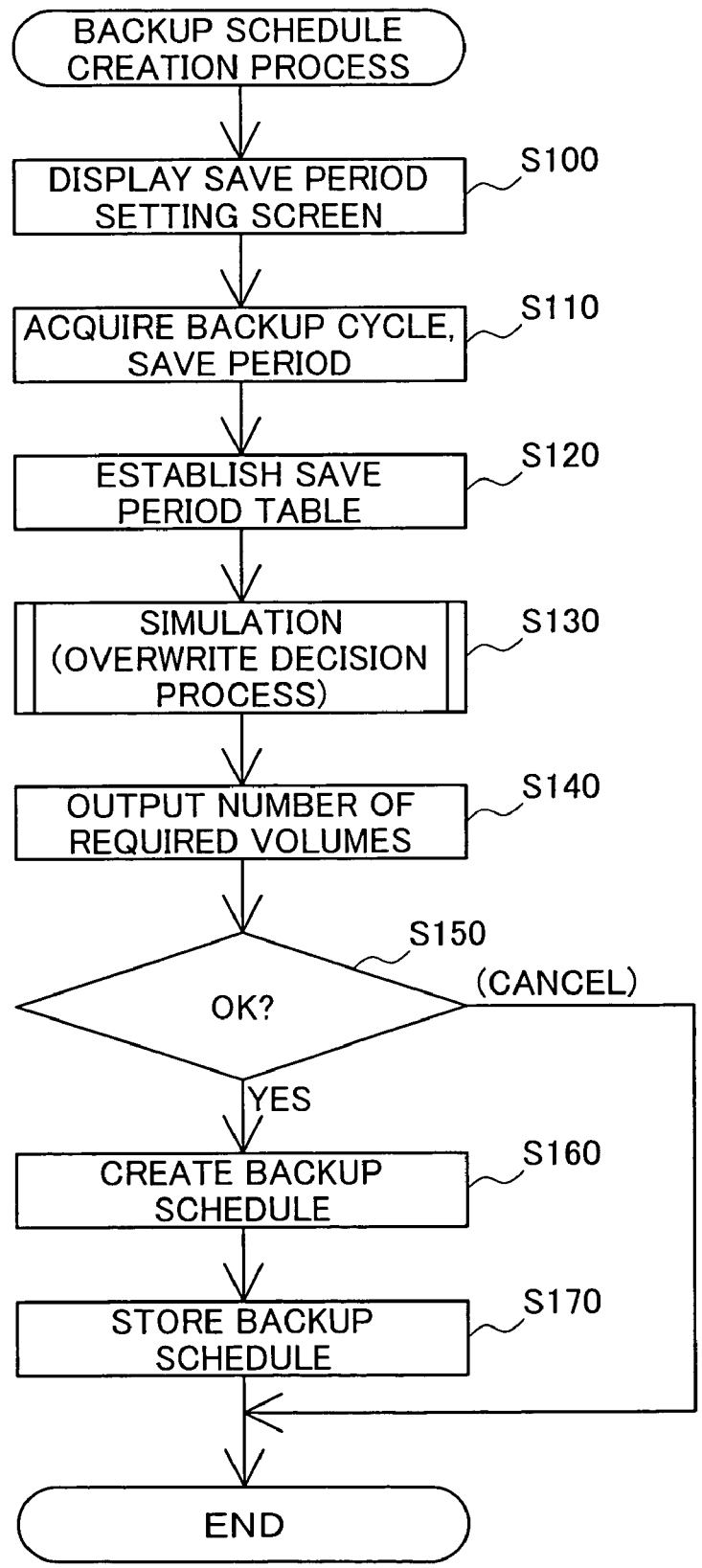
FIG. 11 is a flowchart showing the flow of a backup schedule creation process.

B2-1: Backup Schedule Creation Process:

FIG. 11 is a flowchart showing the flow of a backup schedule creation process. The process is executed by CPU 10 of backup management device 100, in response to an execute instruction by the administrator.

First, CPU 10 displays the save period setting screen shown in FIG. 3 (Step S100). Next, CPU 10 acquires the backup cycle and save periods that have been set by the administrator in the save period setting screen (Step S110), and establishes a save period table (Step S120). CPU 10 then carries out a simulation to calculate the number of secondary volumes 230 needed in order to manage multiple generations of backup, and determine an order of rotation of secondary volumes 230 (Step S130). In this simulation, the overwrite decision process mentioned earlier is executed. The overwrite decision process is a process for deciding whether it is possible to overwrite new backup data onto a secondary volume 230 having backup data previously stored therein. CPU 10 then outputs to box BX in the save period setting screen the number of volumes that will be required, derived from the simulation (Step S140). Step S110~Step S140 are performed each time that the backup cycle, number of generations, or save period is modified. By outputting the number of required volumes in Step S140, the administrator is able to prepare, prior to actual backup, the number of volumes needed to carry out management of desired multiple generations of backup.

Next, CPU 10 makes a determination as to whether the "OK" button BT1 in the save period setting screen has been clicked (Step S150). In the event that the "OK" button BT1 has been clicked (Step S150: YES), a backup schedule 13s is created on the basis of the simulation in Step S130 (Step S160). This backup schedule 31s is then stored in backup schedule storage unit 31e (Step S170). A tape backup schedule is also recorded in this backup schedule 31s. In Step S150, in the event that the "Cancel" button BT2 has been clicked, the process terminates without creating the backup schedule 31s.

By means of the backup schedule creation process described above, it is possible to readily create a backup schedule for administering multiple generations of backup data, even in cases where an algorithm such as "tower of Hanoi" cannot be implemented.

B2-2: Overwrite Decision Process

Following is a description of the overwrite decision process carried out in Step S130 in FIG. 11. As noted earlier, the overwrite decision process is a process for deciding whether it is possible to overwrite new backup data onto secondary volume 230 having backup data previously stored therein. First, an overview of the overwrite decision will be described.

Figure 12:
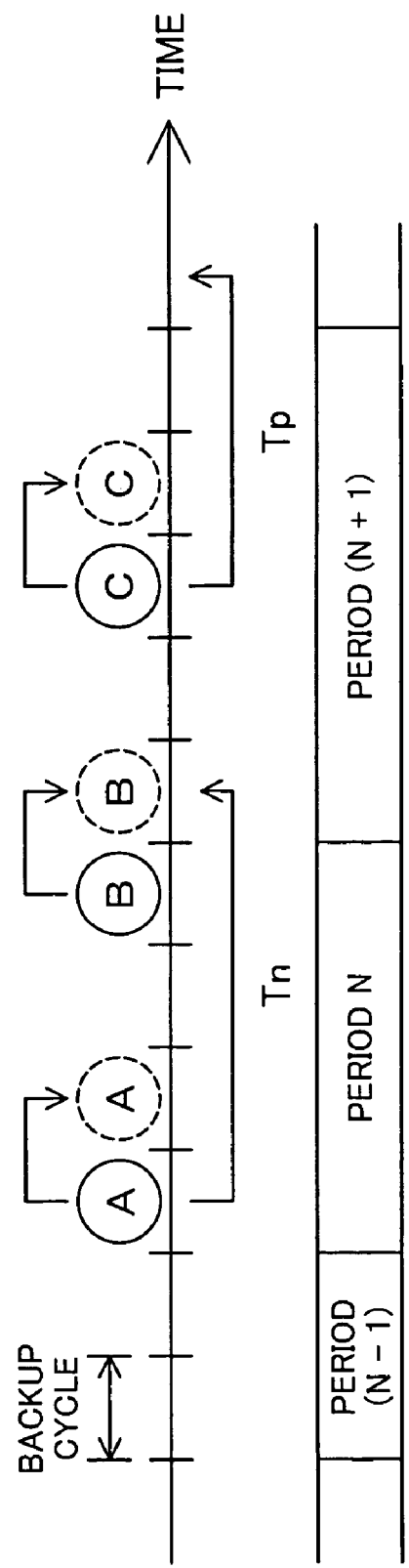
FIG. 12 is an illustration showing the general scheme of an overwrite decision.

FIG. 12 is an illustration showing the general scheme of an overwrite decision. Let it be assumed that currently, backup A and backup B (which is older than backup A) are being held as backups of generation n; and that backup C is being held as the backup of save period (n+1). At the time of the next backup, backup B will move from save period n to save period (n+1). At this time, the time interval Tp until backup C leaves save period (n+1), and the time Tn until backup A (the next newest backup after backup B) moves from save period n to save period (n+1) are calculated, and the two are compared.

In the event that time interval Tn is equal to or shorter than time interval Tp, i.e. in the event that backup A moves to save period (n+1) before backup C leaves save period (n+1), save period (n+1) can be saved by backup C or by backup A even if backup B does not exist, and therefore it becomes possible to overwrite backup B. In the event that time interval Tn is greater than time interval Tp, i.e. in the event that backup C leaves save period (n+1) before backup A moves to save period (n+1), if backup B does not exist, backup data securing save period (n+1) once backup C leaves save period (n+1), and therefore it is not possible to overwrite backup B. The overwrite decision is made in this manner.

Figure 13:
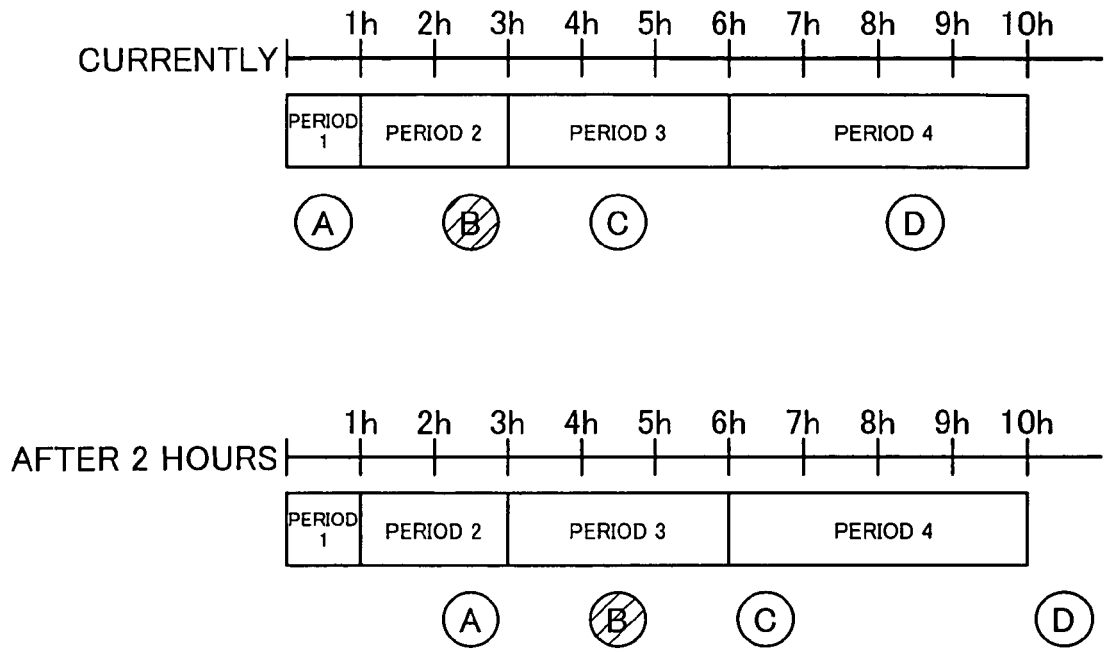
FIG. 13 is an illustration showing a specific example of an overwrite decision.
Figure 13:
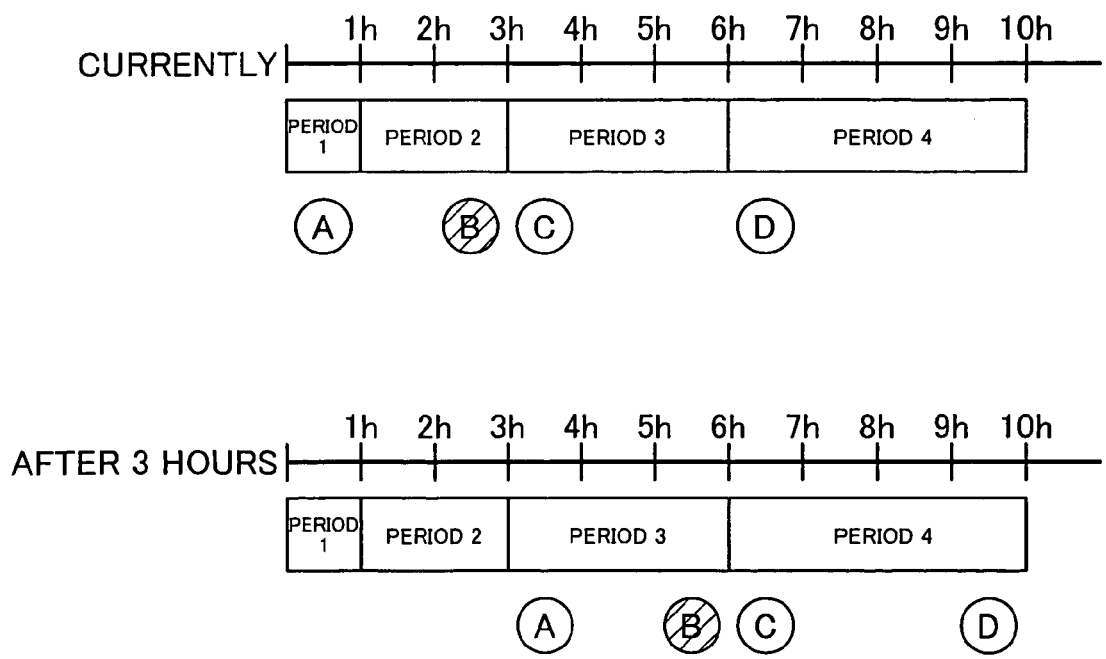

FIG. 13 is an illustration showing a specific example of an overwrite decision. At top in the drawing is an illustration showing a case in which the aforementioned time interval Tn is longer than time interval Tp (Case 1). At bottom is an illustration showing a case in which time interval Tn is equal to or shorter than time interval Tp (Case 2). In the illustrated example, backup cycle time is one hour.

After one hour, backup B moves from the second save period to the third save period. In Case 1, the time interval Tn until backup A moves to the third save period is three hours, and the time interval Tp until backup C leaves the third save period is two hours. In this case, after two hours, backup C will have left the third save period but backup A will have not yet moved to the third save period. Accordingly, in the third save period, backup B must be saved, and backup B cannot be overwritten.

In Case 2, on the other hand, the time interval Tn until backup A moves to the third save period is three hours, and the time interval Tp until backup C leaves the third save period is three hours. In this case, after three hours backup C will have left the third save period and backup A will have moved to the third save period. Accordingly, in the third save period, backup A can be saved even if backup B does not exist, so backup B can be overwritten.

Figure 14:
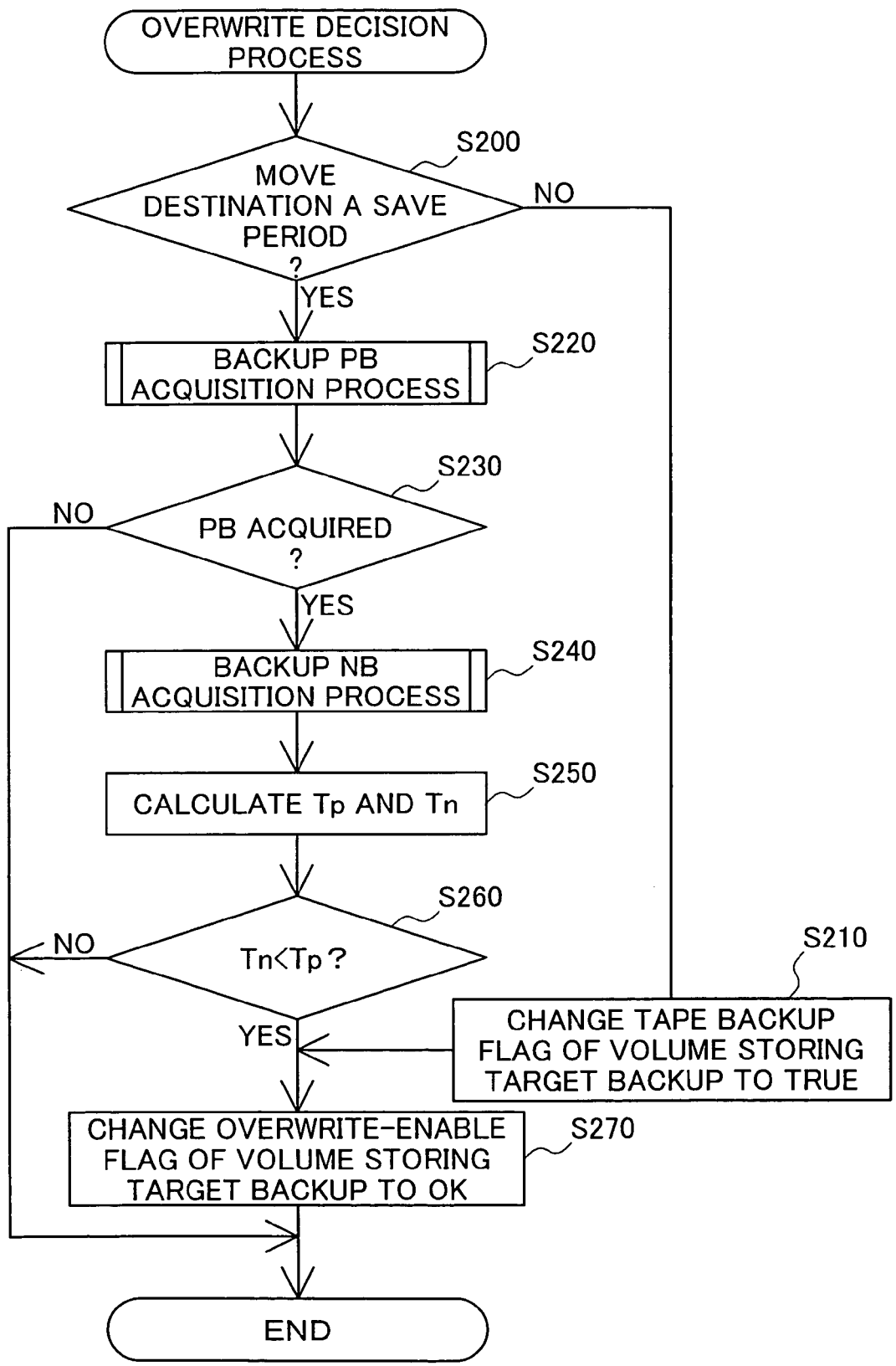
FIG. 14 is a flowchart showing the flow of an overwrite decision process.

FIG. 14 is a flowchart showing the flow of an overwrite decision process. Here, a backup which is about to move form save period, to which the backup now belongs, to next save period at the time of backup acquisition is termed a target backup. The save period to which a target backup is moved is termed save period NR. A backup previously saving a save period NR is termed backup PB. The next newest backup than the target backup is termed backup NB.

CPU 10 refers to the save period table stored in save period table storage unit 31c and to the volume table stored in volume table storage unit 31d to determine whether the destination for moving the target backup is a save period (Step S200). At this time, the overwrite-enable flag and the tape backup flag of the volume storing target backup in the volume table are "NO" and "FALSE" respectively. In the event that the destination for moving the target backup is not a save period (Step S200: NO), in order to execute tape backup at a later point in time, the tape backup flag of the volume storing target backup in the volume table is changed to "TRUE" (Step S210). Since there is no need to hold a target backup that is outside the save period, the overwrite-enable flag is changed to "OK" (Step S270).

In Step S200, in the event of a determination that the destination for moving the target backup is a save period (Step S200: YES), CPU 10 executes a process to acquire the backup PB previously saving the save period NR which is the destination for moving the target backup (Step S220). This backup PB acquisition process will be described later.

Next, CPU 10 determines whether backup PB could be acquired (Step S230). If backup PB could not be acquired (Step S230: NO), the process is terminated. If backup PB could be acquired (Step S230: YES), a process to acquire the backup NB that is acquired after the target backup and saves some period (Step S240). This backup NB acquisition process will be described later.

CPU 10 then calculates the time interval Tp until backup PB leaves save period NR, and the time Tn until backup NB moves to save period NR (Step S250), and determines whether time interval Tn is equal to or shorter than time interval Tp (Step S260). In the event that time interval Tn is longer than time interval Tp (Step S260: NO), the process is terminated. In the event that time interval Tn is shorter than time interval Tp (Step S260: YES), the overwrite-enable flag of the volume storing the target backup in the volume table is changed to "OK" (Step S270).

Figure 15:
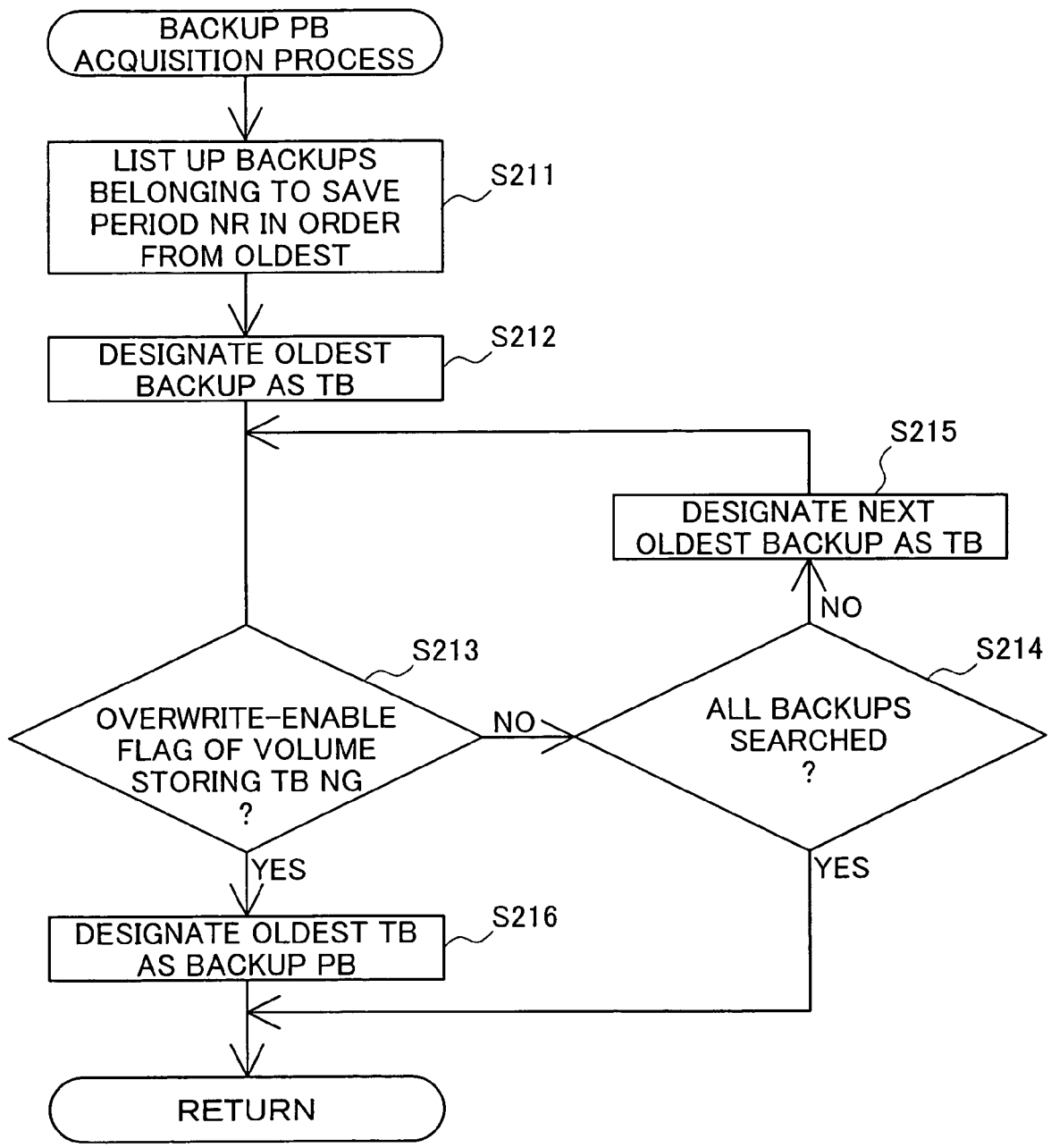
FIG. 15 is a flowchart showing the flow of a backup PB acquisition process.

FIG. 15 is a flowchart showing the flow of a backup PB acquisition process. It is the process of Step S220 in FIG. 14. First, CPU 10 refers to the volume table to list up backups belonging to save period NR, in order from the oldest (Step S211). The oldest backup from among the listed up backups is then designated as backup TB (Step S212).

Next, CPU 10 determines whether the overwrite-enable flag in the volume storing backup TB in the volume table is "NG" (Step S213). In the event that the overwrite-enable flag is "NG" (Step S213: YES), backup TB is now designated as backup PB. In the event that the overwrite-enable flag is "OK" (Step S213: NO), a determination is made as to whether all of the backups listed up in Step S211 were searched (Step S214). In the event that all of the backups listed up in Step S211 were searched (Step S214: YES), the process terminates without being able to acquire backup PB. In the event that not all backups were searched (Step S214: NO), the next oldest backup is designated as backup TB (Step S215), and the routine returns to Step S213.

Figure 16:
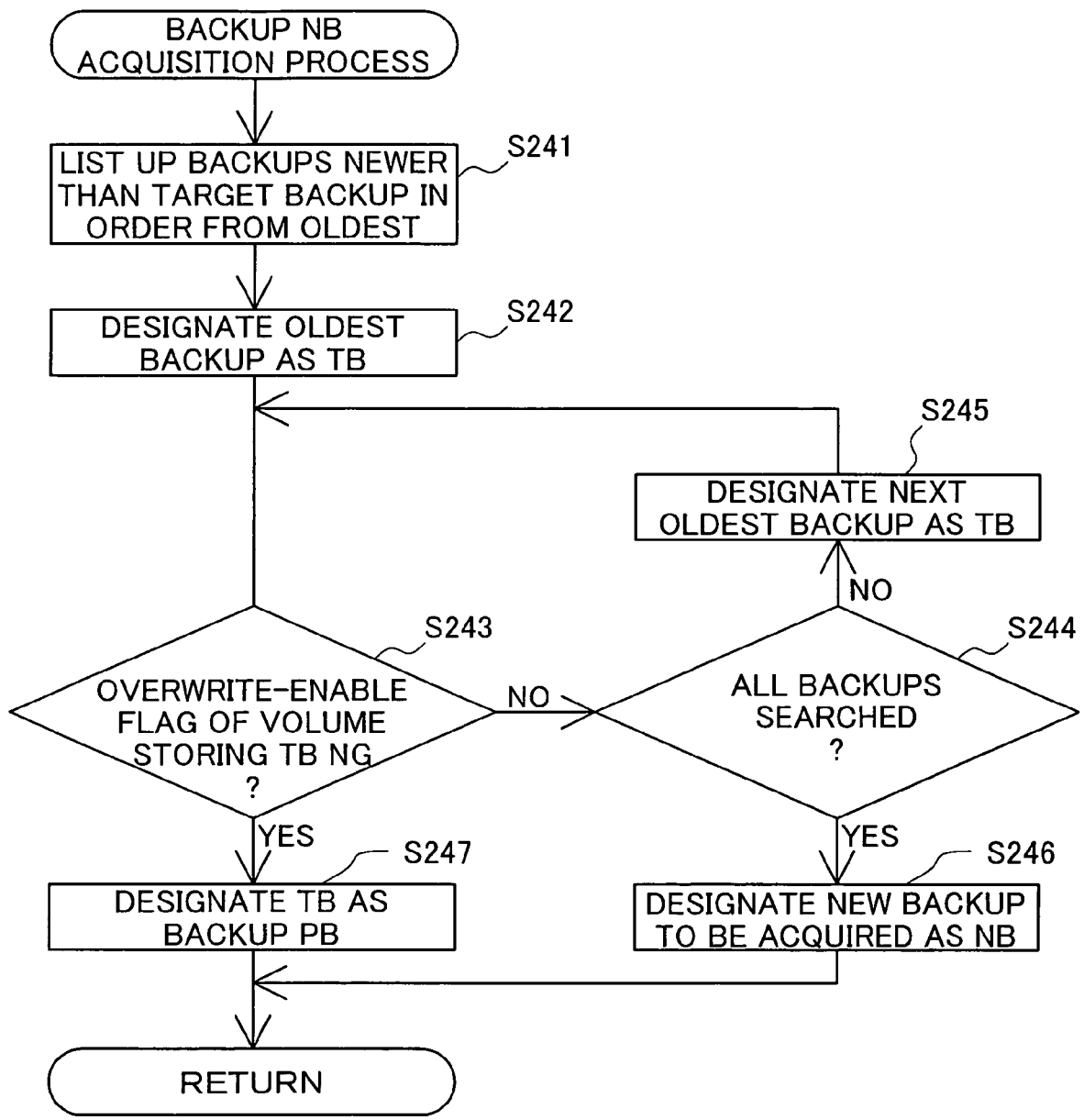
FIG. 16 is a flowchart showing the flow of a backup PB acquisition process.

FIG. 16 is a flowchart showing the flow of a backup PB acquisition process. It is the process of Step S240 in FIG. 14. First, CPU 10 refers to the volume table to list up backups newer than the target backup, in order from the oldest (Step S241). The oldest backup from among the listed up backups is then designated as backup TB (Step S242).

Next, CPU 10 determines whether the overwrite-enable flag in the volume storing backup TB in the volume table is "NG" (Step S243). In the event that the overwrite-enable flag is "NG" (Step S243: YES), backup TB is now designated as backup PB. In the event that the overwrite-enable flag is "OK" (Step S243: NO), a determination is made as to whether all of the backups listed up in Step S241 were searched (Step S244). In the event that not all backups were searched (Step S244: NO), the next oldest backup is designated as backup TB (Step S245), and the routine returns to Step S243. In the event that all of the backups listed up in Step S211 were searched (Step S244: YES), the new backup to be acquired is designated as backup NB (Step S246).

By means of the overwrite decision process described above, selection of backup volumes can be carried out so as to be able to manage multiple generations of backup data with a minimal number of volumes, while at the same time fulfilling save periods that the administrator wants.

Since the number of backups to a volume is greater and the process more laborious than with the process of backup to tape, the embodiment disclosed herein is particularly effective in backup to magnetic disk.

B2-3: Backup Process

Figure 17:
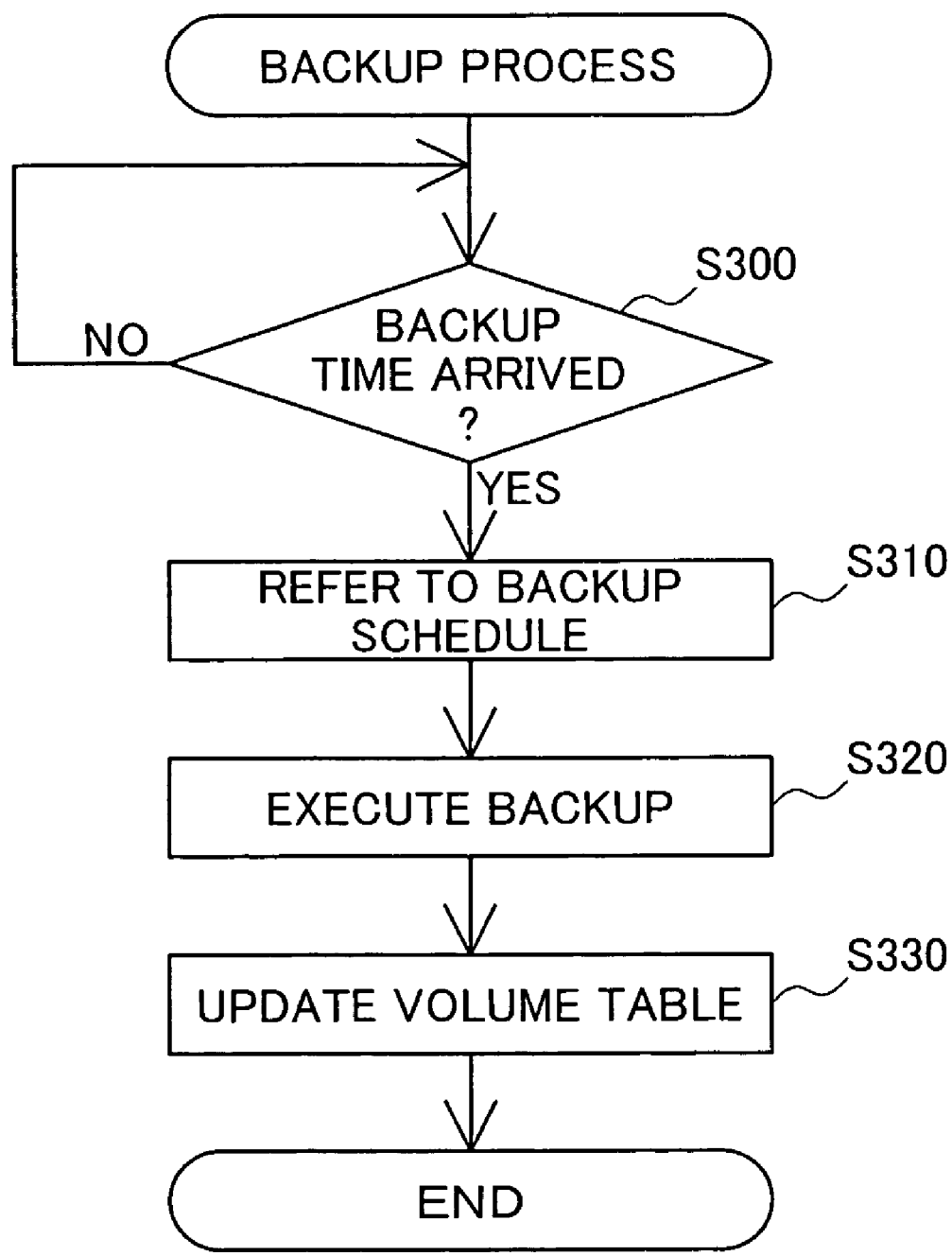
FIG. 17 is an illustration showing the flow of a backup process in schedule mode.

FIG. 17 is an illustration showing the flow of a backup process in schedule mode. The process is executed by CPU 10 of the backup management device 100.

CPU 10 constantly monitors whether a backup time has arrived (Step S300); once a backup time arrives (Step S300: YES) it refers to the backup schedule 31s stored in the backup schedule storage unit 31e (Step S310) and executes backup (Step S320). It then updates the volume table (Step S330).

By means of this backup process, backups can be carried out automatically according to the backup schedule 31s.

B3. Serial Decision Mode:

Following is a description of backup in serial decision mode. During backup in serial decision mode, a secondary volume 230 to which backup will be made is serially selected and backup executed at each backup cycle, without creating a backup schedule 31s. Also, in serial decision mode, save periods can be added, deleted, or modified in length using the graphical user interface WG, even if a backup operation is currently in progress. Additionally, in serial decision mode, backups can be managed in such a way that a backup that the administrator wants to keep is kept. By specifying on the backup hold status display screen W3 a backup that is to continue to be kept, the volume in which the backup is stored is deleted from the volume table. By so doing, the volume is excluded as a target for the decision of the overwrite decision process described earlier, so that the specified backup can continue to be held. Alternatively, a flag indicating that a volume should be excluded from the overwrite decision may be added to the volume table.

Figure 18:
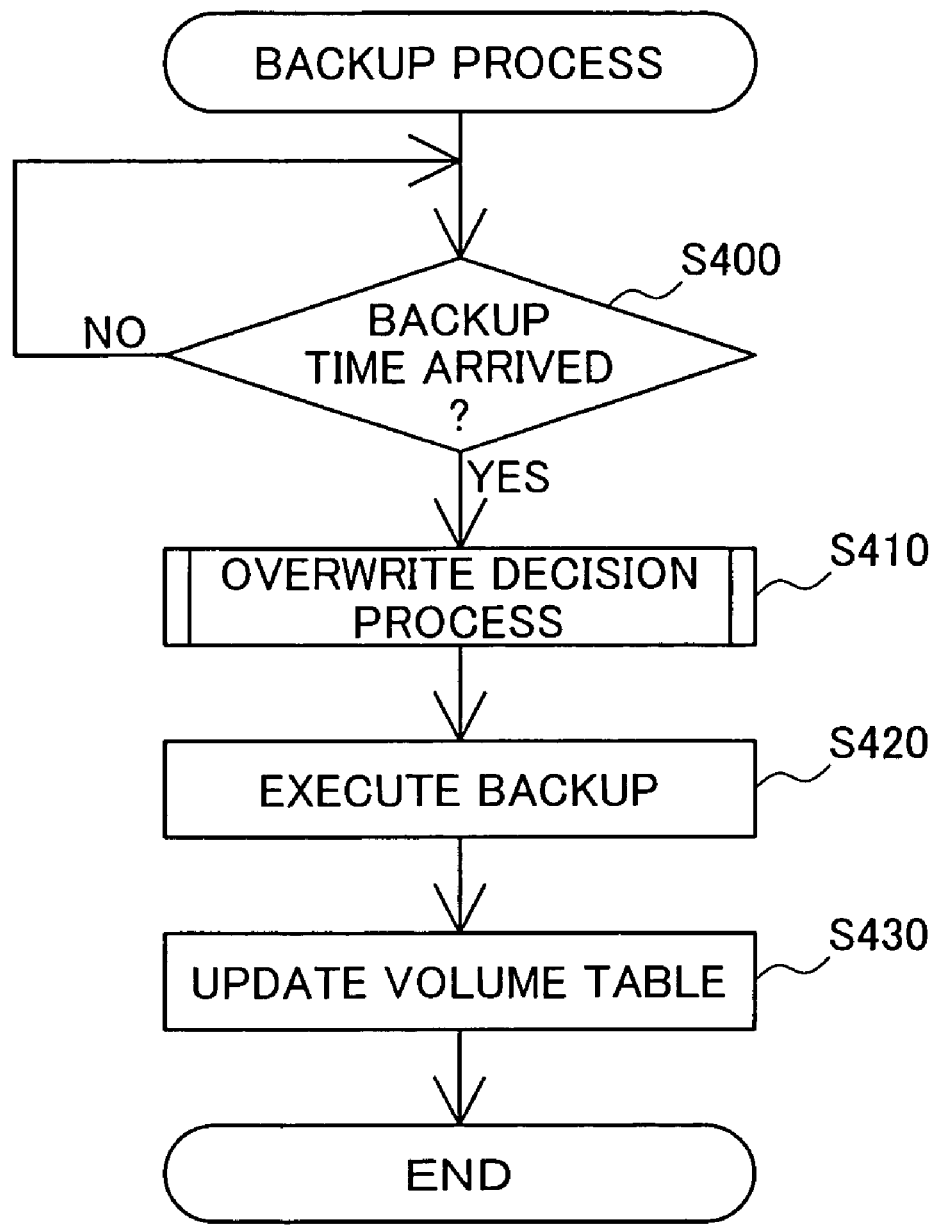
FIG. 18 is an illustration showing the flow of a backup process in serial decision mode.

FIG. 18 is an illustration showing the flow of a backup process in serial decision mode.

CPU 10 constantly monitors whether a backup time has arrived (Step S400); once a backup time arrives (Step S400: YES) it executes the overwrite decision process described earlier (Step S410). On the basis of the decision result, it selects a backup volume, and executes backup (Step S420). At this time, if no overwriteable volume exists, it refers to the information stored in the linked software information storage unit 31h and requests the provisioning tool for a new backup volume.

The volume table is then updated (Step S430). In the event that a new volume has been assigned, one record is added to the volume table and update the volume table.

By means of this backup process, an overwriteable backup medium may be serially selected automatically from among a plurality of secondary volumes 230 at each backup cycle, and backup carried out automatically.

According to the backup management device 100 of the first embodiment described hereinabove, multiple generations of backup data can be managed, while permitting the administrator to set save period individually for each generation.

Figure 19:
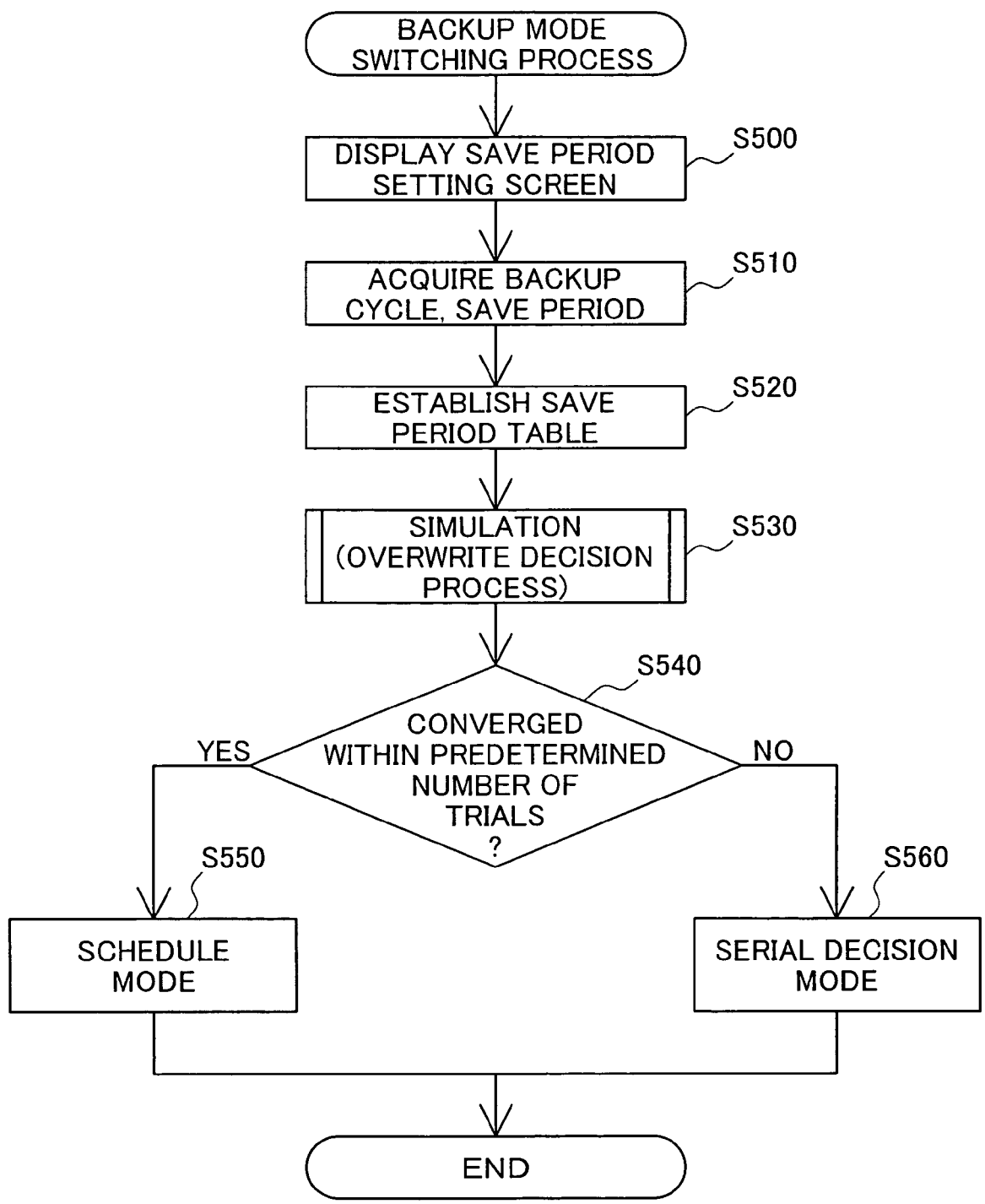
FIG. 19 is a flowchart showing the flow of a backup mode switching process.

C. Second Embodiment:

In the first embodiment, switching between backup modes by backup administration device 100 is performed by means of selection by an administrator; in a second embodiment, however, switching between backup modes is carried out automatically. In other respects the device is substantially identical to that in the first embodiment FIG. 19 is a flowchart showing the flow of a backup mode switching process. The process is executed by CPU 10 of the backup management device 100.

CPU 10 first displays the save period setting screen shown in FIG. 3 (Step S500). Next, CPU 10 acquires the backup cycle and save periods that have been set by the administrator in the save period setting screen (Step S510), and establishes a save period table (Step S520). CPU 10 then calculates the number of secondary volumes 230 needed in order to manage multiple generations of backup sufficient for the set backup cycle and save periods, and carries out a simulation in order to determine an order of rotation of secondary volumes 230 (Step S530). This simulation is the same as Step S130 of the backup schedule creation process shown in FIG. 11. The number of simulation trials can be set arbitrarily by the administrator.

Next, CPU 10 determines whether a pattern of rotation of secondary volumes 230 has converged within a predetermined number of trials (Step S540). Here, "a rotation pattern has converged" means that a pattern is found in the order of rotation. In the event that a rotation pattern has converged within a predetermined number of trials (Step S540: YES), the backup mode is set to schedule mode (Step S550). In the event that a rotation pattern has not converged within a predetermined number of trials (Step S540: NO), the backup mode is set to serial decision mode (Step S560). The number of trials can be set arbitrarily by the administrator. By means of this process, backup mode can be switched automatically.

Subsequently, where the backup mode is schedule mode, a backup schedule 31s is created in the same manner as the backup schedule creation process shown in FIG. 11, and backup processes executed in accordance therewith. Where the backup mode is serial decision mode, the backup process described below is executed.

Figure 20:
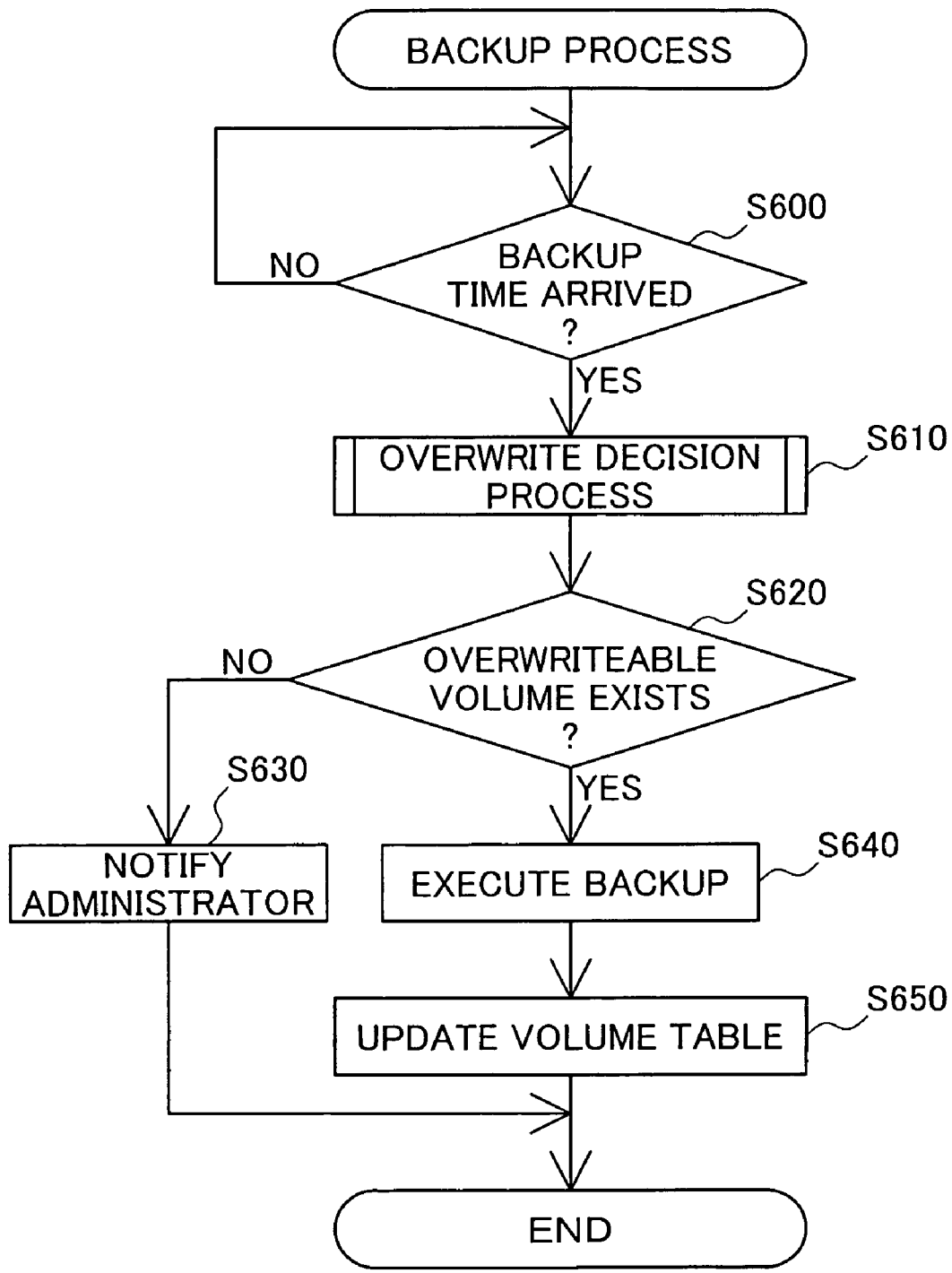
FIG. 20 is an illustration showing the flow of a backup process in serial decision mode.

FIG. 20 is an illustration showing the flow of a backup process in serial decision mode.

CPU 10 constantly monitors whether a backup time has arrived (Step S600); once a backup time arrives (Step S600: YES) it executes the overwrite decision process described earlier (Step S610) and determines whether an overwriteable volume exists (Step S620). If no overwriteable volume exists (Step S620: NO), it notifies the administrator to this effect (Step S630). At this time, tape backup could be performed in place of a secondary volume 230. In Step S620, if overwriteable volume exists (Step S620: YES), backup to that volume is executed (Step S640), and the volume table is updated (Step S650).

According to the backup administration device 100 of the second embodiment described hereinabove, while permitting the administrator to set save period individually, multiple generations of backup can be carried out while switching between a mode in which backups are carried out according to a backup schedule 31s and a mode in which backups are carried out by automatic serial selection of an overwriteable backup medium at each backup cycle.

D. Variations:

While the invention has been described hereinabove in terms of a number of embodiments, the invention is not limited to the embodiments herein, and could be reduced to practice in various ways without departing from the scope and spirit thereof. The following variations are possible, for example.

D1. Variation 1:

In the embodiments hereinabove, the backup administration device 100 carries out backup from a primary volume 220 to secondary volumes 230 and from secondary volumes 230 to magnetic tape, but is not limited to doing so. A plurality of disk array devices or other external storage devices could be connected to the SAN, and backup carried out to these devices.

D2. Variation 2:

In the embodiments hereinabove, an administrator is able to set the backup cycle, number of backup generations, and save period for each generation by means of a graphical user interface WG; while this improves the convenience of the backup management device 100, it is not limited thereto. Provided that the administrator is able to set the save period for each generation, the backup cycle and number of backup generations may be fixed.

Finally, the present application claims the priority based on Japanese Patent Application No. 2003-432113 filed on Dec. 26, 2003, which is herein incorporated by reference.

What is claimed is:

1. A backup management device that manages multiple generations of backup data by rotating a plurality of rewriteable backup media while recording backup data onto the backup media according to a predetermined backup cycle, the backup management device comprising:

a save period input unit that receives save periods for which the backup data should be saved, the save period being individually set by the administrator for each of the multiple generations;

an overwrite-targeted backup medium selecting unit that selects an overwrite-targeted backup medium on the basis of the backup cycle and the save period;

a backup executing unit that executes new generation backup by overwriting the selected overwrite-targeted backup medium, and when a decision is that overwriting is not possible, prepares a new backup medium and executes first generation backup, or issues a warning to the user;

a save period storage unit that stores the save period; and a medium information storage unit that stores information regarding the backup medium and the time at which the backup data was stored in the backup, in association with one another, wherein the overwrite-targeted backup medium selecting unit comprises:

a decision unit that refers to the save period storage unit and the medium information storage unit, and when generation n (n is a natural number) backup data moves to a save period (m+1) one period older than a save period m to which the generation n belongs, decides whether first generation backup data is overwriteable onto the backup medium in which the backup data was stored; and wherein the decision unit compares a first predetermined time interval until generation (n−1) backup data one newer than the generation n backup data moves to the save period (m+1) with a second predetermined time interval until the generation (n+1) backup data leaves the save period (m+1), and when the first predetermined time interval is equal to or shorter than the second predetermined time interval, decides that the backup medium storing the generation n backup data is overwriteable.

2. The backup management device according to claim 1, the backup management device comprising:
a backup cycle receives unit that inputs the backup cycle set by the user.

3. The backup management device according to claim 1, the backup management device comprising:
an output unit that refers to the save period storage unit and the medium information storage unit, and outputs in association with one another the save period, the backup medium in which the backup data was stored, and the time at which the backup data was stored in the backup medium.

4. The backup management device according to claim 1, wherein the save period input unit permits input of the save period under the following conditions:
Condition (i) a plurality of the save periods are successive; and
Condition (2): the save period of generation (n+1) (n is a natural number) is older than the save period of generation n, and a length of the save period (n+1) is equal to or greater than a length of the save period n.

5. The backup management device according to claim 4, wherein the conditions include:
Condition (3): a length of the save period is an integral multiple of the backup cycle.

6. A control method for controlling a backup management device that manages multiple generations of backup data by rotating a plurality of rewriteable backup media while recording backup data onto the backup media according to a predetermined backup cycle, the control method comprising:
(a) inputting a save period for which the backup data should be saved, the save period being individually set by the user for each of the multiple generations;
(b) executing backup by means of selecting a predetermined overwrite-targeted backup medium on the basis of the backup cycle and the save period;
(c) storing the save period in a save period storage; and
(d) storing within a medium information storage, information regarding the backup medium and the time at which the backup data was stored in the backup, in association with one another;
wherein the selecting of the overwrite-targeted backup medium includes refering to the save period storage and the medium information storage, and when generation n (n is a natural number) backup data moves to a save period (m+1) one period older than a save period m to which the generation n belongs, and deciding whether first generation backup data is overwriteable onto the backup medium in which the backup data was stored; and
wherein the deciding compares a first predetermined time interval until generation (n−1) backup data one newer than the generation n backup data moves to the save period (m+1) with a second predetermined time interval until the generation (n+1) backup data leaves the save period (m+1), and when the first predetermined time interval is equal to or shorter than the second predetermined time interval, decides that the backup medium storing the generation n backup data is overwriteable.

7. A control method for controlling a backup management device that manages multiple generations of backup data by storing backup data onto any of a plurality of rewriteable backup media, according to a predetermined backup cycle, the control method comprising:
(a) inputting a save period for which the backup data should be saved, the save period being individually set by the user for each of the multiple generations;
(b) storing the save period in a save period storage;
(c) storing in a medium information storage, information regarding the backup medium and the time at which the backup data was stored on the backup medium, in association with one another;
(d) at each backup cycle, referring to the save period storage and the medium information, and when generation n (n is a natural number) backup data moves to a save period (m+1) one period older than a save period m to which the generation n belongs, deciding whether first generation backup data is overwriteable onto the backup medium in which the backup data was stored;
(e) when the decision result is that overwriting is possible, executing first generation backup by overwriting the backup medium, and when the decision result is that overwriting is not possible, preparing a new backup medium and executing first generation backup, or issuing a warning to the user; and
wherein the deciding compares a first predetermined time interval until generation (n−1) backup data one newer than the generation n backup data moves to the save period (m+1) with a second predetermined time interval until the generation (n+1) backup data leaves the save period (m+1), and when the first predetermined time interval is equal to or shorter than the second predetermined time interval, deciding that the backup medium storing the generation n backup data is overwriteable.

8. A computer program product for control of a backup management device that manages multiple generations of backup data by rotating a plurality of rewriteable backup media while recording backup data onto the backup media according to a predetermined backup cycle, the computer program product comprising:
a computer readable medium;
a first program code that acquires a save period for which the backup data should be saved, the save period being individually set by the user for each of the multiple generations;
a second program code that selects a predetermined overwrite-targeted backup medium on the basis of the backup cycle and the save period;
a third program code that executes first generation backup by overwriting the selected overwrite-targeted backup medium, and when a decision is that overwriting is not possible, prepares a new backup medium and executes first generation backup, or issues a warning to the user,
a fourth program code that stores the save period in a save period storage;
a fifth program code that stores, in a medium information storage, information regarding the backup medium and the time at which the backup data was stored in the backup, in association with one another;
wherein each of the program codes is stored on the computer readable medium;
wherein the decision refers to the save period storage and the medium information storage, and when generation n (n is a natural number) backup data moves to a save period (m+1) one period older than a save period m to which the generation n belongs, decides whether first generation backup data is overwriteable onto the backup medium in which the backup data was stored; and wherein the decision compares a first predetermined time interval until generation (n−1) backup data one newer than the generation n backup data moves to the save period (m+1) with a second predetermined time interval until the generation (n+1) backup data leaves the save period (m+1), and when the first predetermined time interval is equal to or shorter than the second predetermined time interval, decides that the backup medium storing the generation n backup data is overwriteable.

* * * * *